United States Patent [19]
Kuo

[11] Patent Number: 5,572,641
[45] Date of Patent: Nov. 5, 1996

[54] METHOD AND DEVICE FOR GRAPHS WITH DIFFERENT LAYERS

[76] Inventor: Yu-Hsia Kuo, No.1, Lane 276, Chu-Lin Road, Lin 4, Ching-Hu Village, Lin-Kou Hsiang, Taipei Hsien, Taiwan

[21] Appl. No.: 458,619

[22] Filed: Jun. 2, 1995

Related U.S. Application Data

[63] Continuation of Ser. No. 1,664, Jan. 7, 1993, abandoned.

[51] Int. Cl.⁶ ..................................................... G06F 15/00
[52] U.S. Cl. ....................................................... 395/140
[58] Field of Search ................................... 395/140, 141, 395/142, 161, 155

[56] References Cited

U.S. PATENT DOCUMENTS

4,912,644  3/1990  Aoyama et al. ...................... 364/472
5,295,244  3/1994  Dev et al. ........................... 395/161

Primary Examiner—Phu K. Nguyen
Attorney, Agent, or Firm—Bacon & Thomas

[57] ABSTRACT

A method and device for creating graphs with different layers in computer in which each graph or icon is viewed as a combination of some sub-icons and variable parameters that are saved in an icon databank. The device comprises a graphic input analyzer, an icon shape variation device, an icon profile generator, a profile connecting device, a color classification buffer, a color palette and an output buffer, in which the format of each graph is <number of icons> <icon 1> <icon 2> <icon 3> . . . etc. and each icon can be divided into several sub-icons controlled by the same parameters for the icon.

8 Claims, 10 Drawing Sheets

METHOD AND DEVICE FOR GRAPHS WITH DIFFERENT LAYERS

This application is a continuation of application Ser. No. 08/001,664, filed Jan. 7, 1993 abandoned.

BACKGROUND OF THE INVENTION

1. Field of the Invention

The present invention relates to a method for and a device for creating graphs with different layers, particularly, a method and device for creating icons with different layers and building blocks in a computer.

2. Description of Related Art

Advance computer technology has brought to human beings efficiency, quality and ease of management. Steps toward a computerized world are proceeding at an even faster pace. For example, rapid progress is being made with respect to the process of digitizing graphs and characters. The application of scanners has made graphic digitizing possible, thus promoting computerized publishing and the development of multimedia applications. The further development of time-saving, highly efficient graphic digitizing, and capacity-saving, low cost graphic storage for the highest quality graphs are goals that all of those skilled in the art strive for.

Currently, the production of motion pictures, cartoons and TV games, are still time and manpower consuming. Connecting pictures with minor changes to create a continuous motion picture requires icon design, color painting and quality control. In the design of Chinese characters of which about 10,000 are used daily, one finds that these words are created by combining similar patterns, for example, numbers of strokes, prefix, suffix or others. Conventionally, it is time consuming to write each typeface of a word, one by one, and then digitize it for processing by computer. Besides being time consuming, the digitized data storage in a computer requires lots of memory capacity and a high cost.

Regarding methods to generate high quality fonts, we can first refer to an article entitled "A Structured Design Methodology for Chinese Character Fonts", by K. J. Chen and K. Y. Cheng in proceedings published by an international conference (ICPT) in 1983, and then a paper published by the Ministry of Education of the Republic of China in July 1984—"The Design of the Generation of Large Chinese Character Fonts in Personal Computers" by C. C. Hsieh, C. T. Chang and P. S. Chen, and a Republic of China Patent No. 38830—"Method and Device for the High Resolution Character Fonts Generation" granted to Mr. K. Y. Cheng and Mr. J. C. Young. These three papers, in spite of the different wordings in their titles, discussed the same subject: generation of Chinese character fonts in computer. There are numerous inventors and authors following them, and also researching on the same topic. Basically the existing methods can perform the following:

(1) Creation of various typefaces with different variations, such as large, small, bold, fine, tall and short fonts;

(2) Occupation of approximately a constant memory for each character; and (3) Output as a point matrix or vector.

Figure 5:
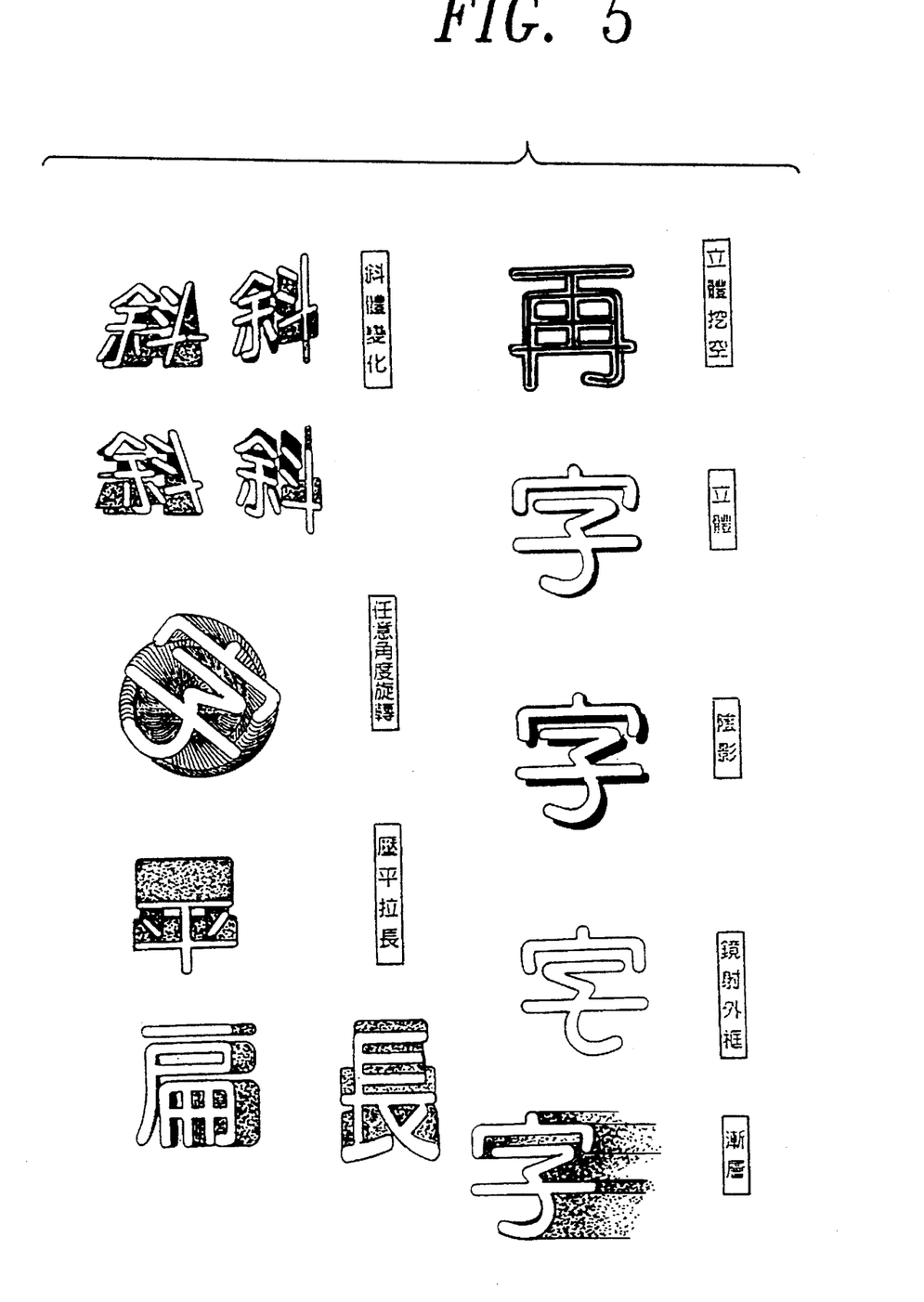
FIG. 5 illustrates an example of typeface variation according to the present invention.

Whatever the precise merits, features and advantages of the above cited references, none of them can fulfill the future need because of the following defects:

(1) They can't perform two-dimensional variation in the typeface of each character, such as rotation or inverting at any angle, stretching or compressing of height of the typeface or the combination of any of the above, as shown in FIG. 5.

Figure 3A:
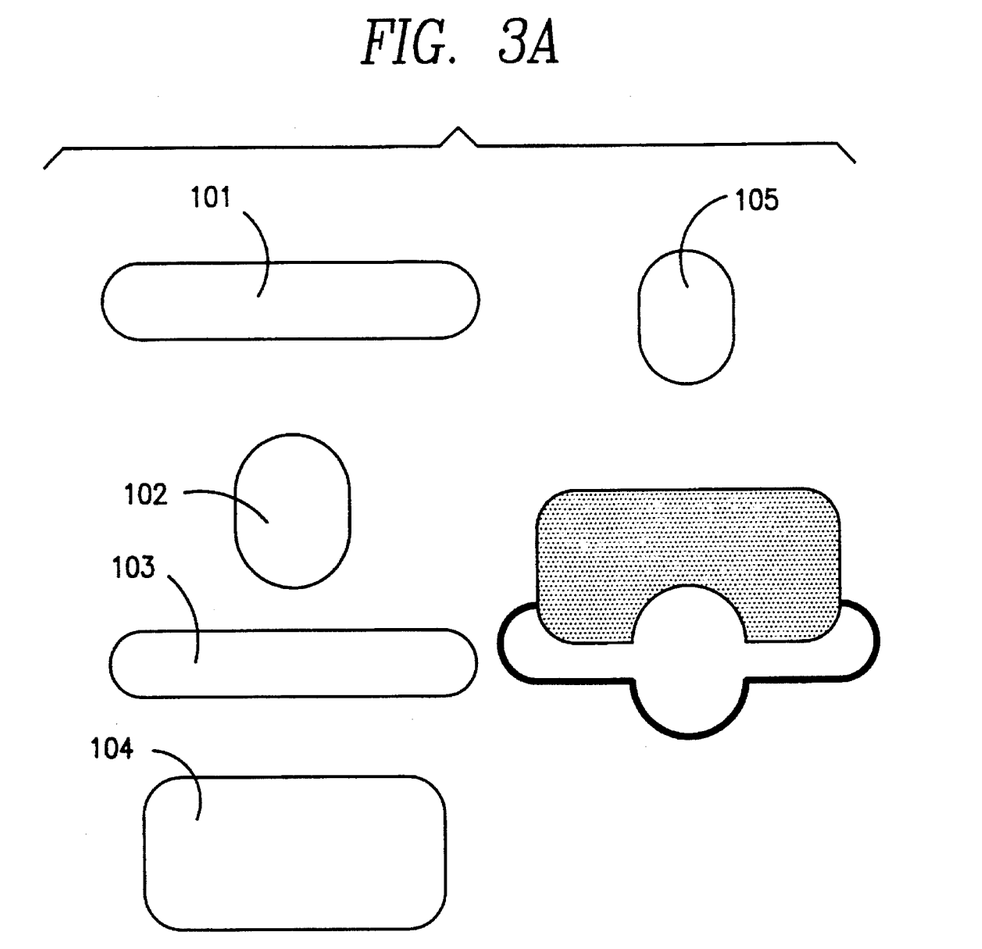
FIGS. 3A–3C illustrates using a layered display to create a complete Chinese character " 桊 " according to the present invention.
Figure 3B:
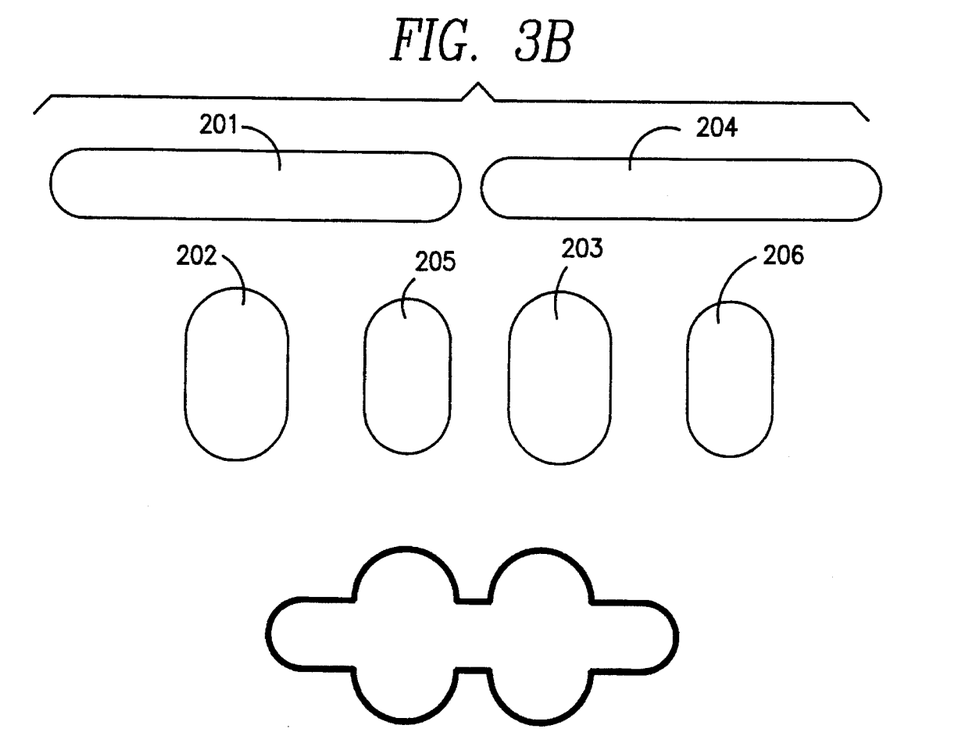
Figure 3C:
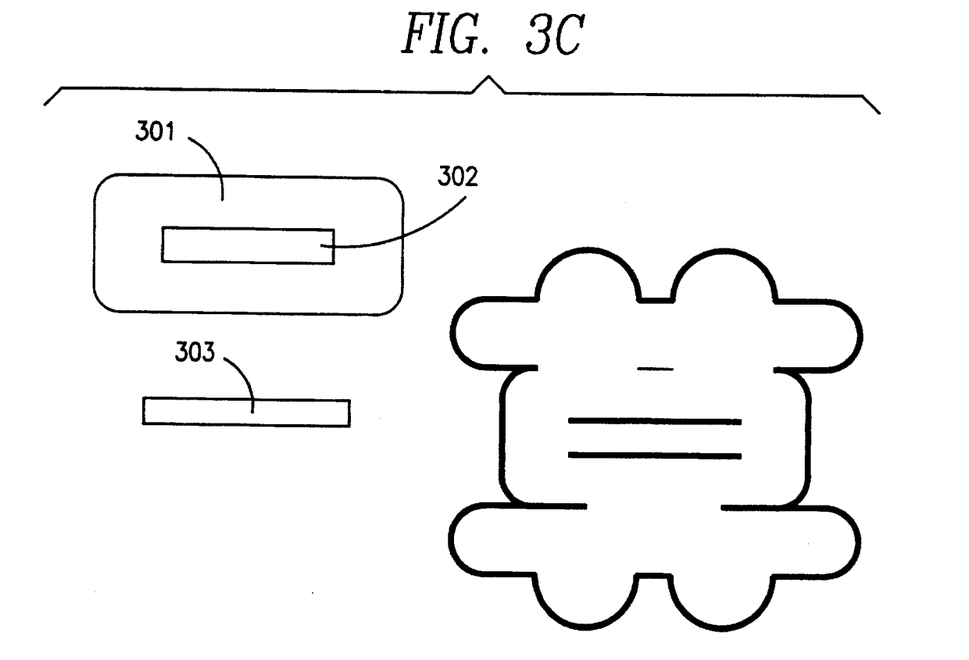
Figure 4A:
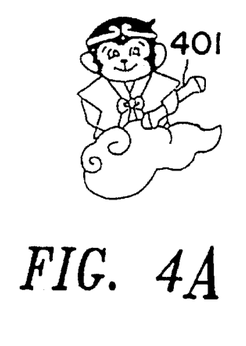
FIGS. 4A–4J illustrates an example of graphic variations according to the present invention.
Figure 4B:
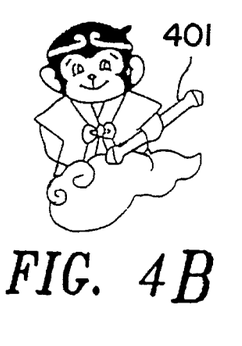
Figure 4C:
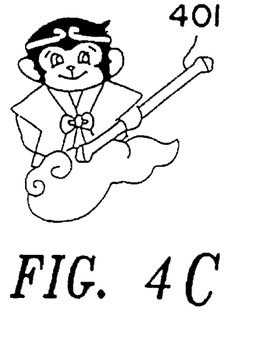
Figure 4D:
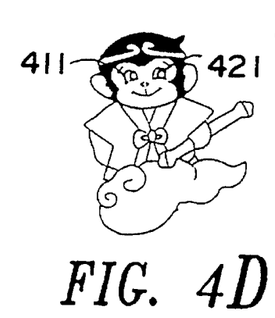
Figure 4E:
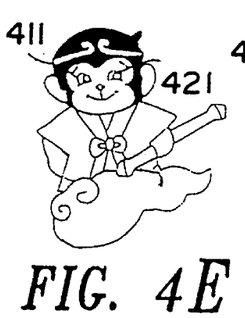
Figure 4F:
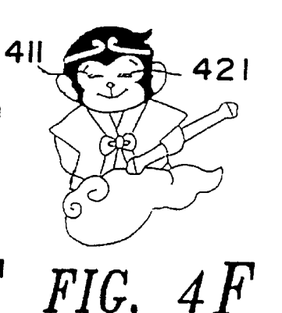
Figure 4G:
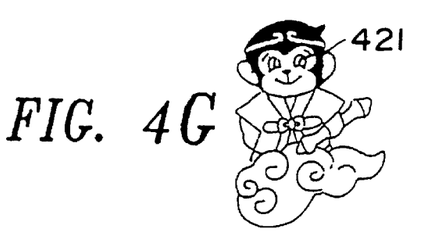
Figure 4H:
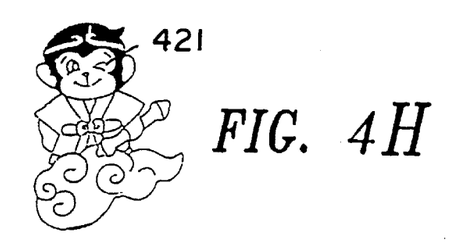
Figure 4I:
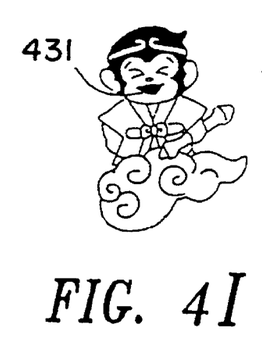
Figure 4J:
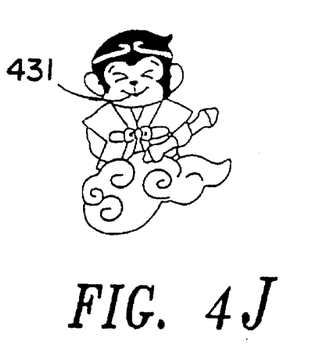

(2) They can't perform three-dimensional variations and toning up or down of each character as illustrated in FIGS. 3 and 5—the conventional method can add a single color to each stroke only.

Figure 9:
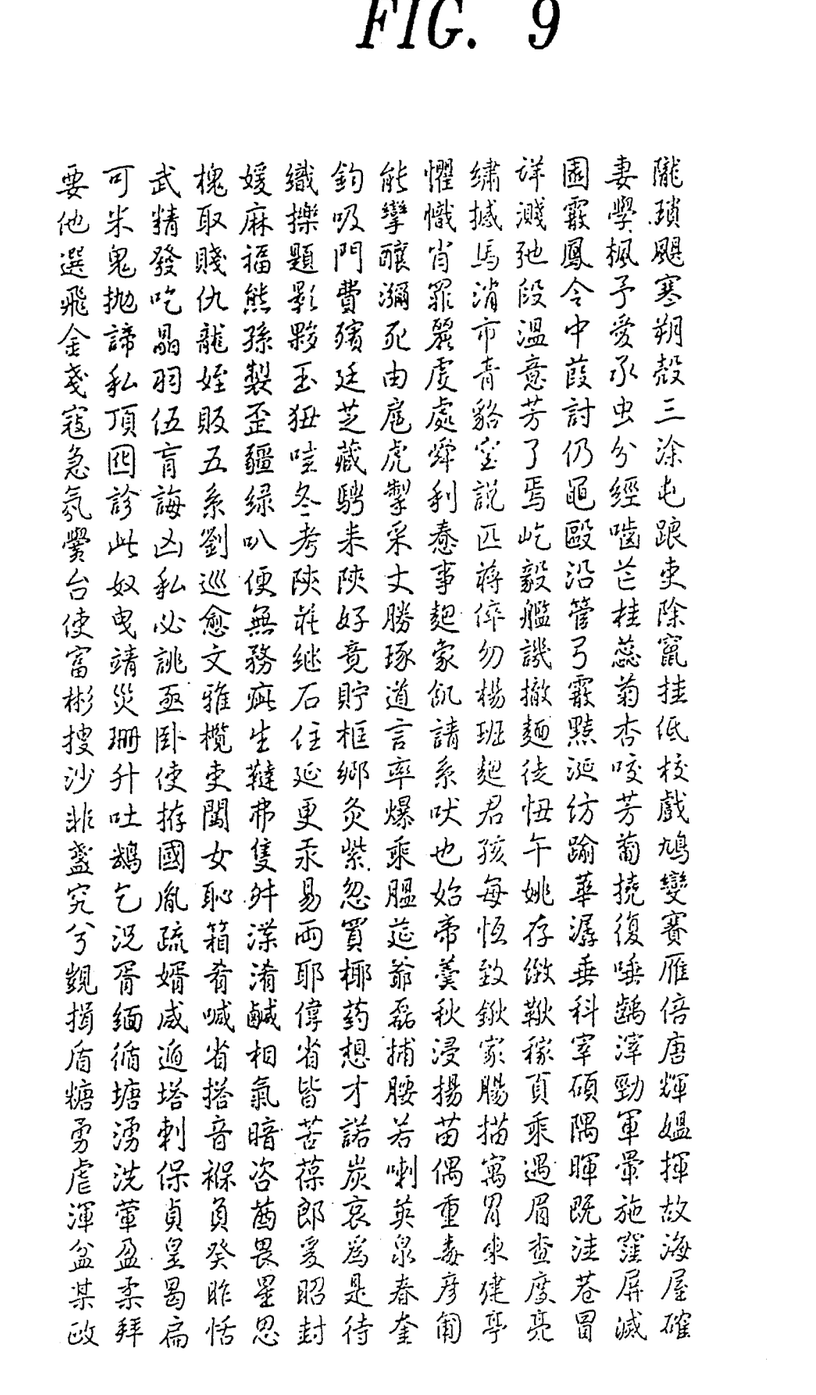
FIG. 9 illustrates an example of Chinese Cursive scripts according to this invention.

3) Each character requires a considerable large memory for some complicated scripts such as the Chinese Cursive or Running handwriting styles, as well as graphs in layers, for the conventional method treats each character as a special symbol. However, in this invention, each character is treated as a regular icon, as shown in FIG. 9.

The present invention is a method and device for creating graphs with different layers to eliminate the above defects. Therefore, an object of the present invention is to provide a method and device to generate a set of color graphs using computer technology, and such a method and device can be utilized to develop a set of artistic typefaces or graphs to resolve the drawbacks of the conventional method.

According to a particular feature of the present invention a set of graphs will be analyzed and classified in advance in the production of a comic book, (either color or black and white), cartoon pictures or a set of 10,000-word Chinese Running scripts. Icons are used as the building blocks in different layers to create different graphs. In the creation of the icon, this invention utilizes three variable parameters—color attributes, coordinates and the vector length to create icons with different or similar color, pattern or partial modification, display these icons as building blocks in different layers and color them to create a whole graph. Using the technique of variable parameters can save tedious works in coloring and picture production, cutting the length of time and cost in picture production, and enabling the variations in pictures and creates the case of motion picture production.

An additional feature of this invention is to use the codes and the variable parameters of the icons from the memory to describe a graph or picture. It is not necessary to store the data of the whole picture, therefore the data storage takes less memory. (Take the Chinese Running scripts, for example, the ratio of data for this method as compared to the pure vector method is 1:15). Based on this example, this invention is using a minimum physical size and lowest cost to store and produce the static picture or digitized images in motion. It is a new and practical method.

The following is a comparison on the typefaces of the Chinese characters between the method according to the present invention and the conventional method:

(1) The conventional method can process the slanting typefaces either vertically or horizontally, including typefaces with outline and shadow. For slanting typefaces an additional output dot matrix has to be generated and process by external design, in addition, the slanting angle for the typeface is not controllable, if the slanting angle is changed, an additional set of typefaces has to be generated. The time frame to generate each set of typeface is approximately one year. If we have 10 sets of typeface and each set has 2 slanting angles, it would take 20 years to complete the design. The method according to the present invention does not require the generation of additional set of typeface because the slanting angle is controllable, including outline and shadow typefaces.

(2) This invention use the matrix variation to create a two-dimensional change in the typefaces including the rotation, inverting at any angle, stretching, compressing or any of the above combination. The conventional method can only change the typeface inside a square frame but can not rotate at any angle, as shown in FIG. 5;

(3) The conventional method in coloring can handle only one character at a time, this invention has the advantage of assigning color to a single stroke of a character.

(4) The conventional method can only darken one character at a time. The method according to the present invention has a distinctive feature to create typefaces in a number of layers, as shown in FIG. 3.

(5) The conventional method treats the Chinese Cursive or Running scripts as a chart of special symbol, therefore each word takes up a lot of memory. The method according to the present invention handles the Cursive and Running scripts as regular word, such as "Ming Style Chinese Character Fonts" as shown in FIG. 9.

In accordance with the present invention, we eliminate the defects and difficulties of the prior art by providing a method to create the variable typefaces and graphs to satisfy the present and future demand.

SUMMARY OF THE INVENTION

The objective of this invention is to provide a method and device for creating graphs with different layers in a computer, in which the graphs may be viewed as the combination of some icons and variable parameters that are saved in the icon storage, the device according to the present invention including a graphic input analyzer, an icon shape variation device, an icon profile generator, a profile connecting device, a color classification buffer, a color palette and an output buffer, and the format of each graph is <number of icons> <icon 1> <icon 2> <icon 3> . . . etc., where each icon can be divided into several sub-icons which can be controlled by the same parameters.

BRIEF DESCRIPTIONS OF THE DRAWINGS

The features and advantages of the present invention will become apparent from the following detailed description of the invention when read with the accompanying drawings. These drawings are for reference and illustration uses only and are not intended to limit the present invention.

DESCRIPTION OF PREFERRED EMBODIMENTS

The preferred embodiment of the present invention will now be described with reference to the accompanying Figures.

Figure 1:
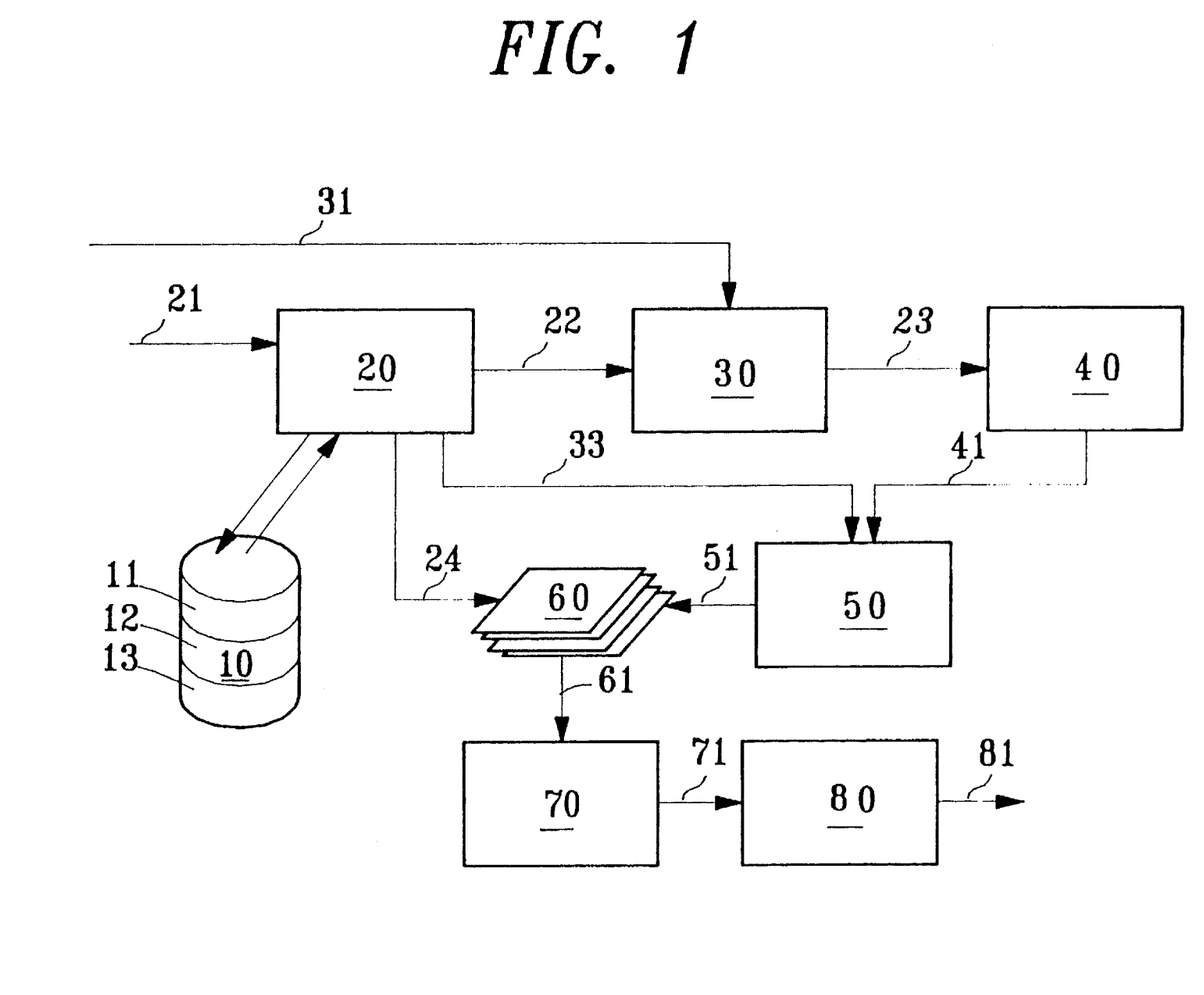
FIG. 1 is a block diagram for graph generation according to the present invention.

Referring to FIG. 1, a block diagram for generation of graphs with different layers according to the present invention, basically each Chinese character is treated as a graph in the form of an icon comprising some sub-icons. The same principle can be applied to other scripts and characters such as English, Korean and Japanese, etc. Each of these individual characters is made up of a set of icons and their variable parameter, the format of each graph is made up of <number of icons> <icon 1> <icon 2> <icon 3> . . . Each icon is represented by its code and a set of variable parameters. The variable parameters can be classified into 3 groups; color attribute code, the coordinates, and vector quantity. The device according to this invention is to use an icon 11 and its variable parameters 12 for each character, and store them into an icon databank 10 for creating a certain graph, or directly inputting each graphic information 21 into a graphic analyzer 20, or inputting a variable matrix 31 into an icon shape variation device 30. There is a register for storing information from an external input in the graphic analyzer 20. The analyzer 20 analyzes the information to provide several icons, or the device selects icon information 11 and variable parameters 12 from the icon databank 10 according to the information, while at the same time an icon description formula 13 is loaded into the graphic analyzer 20. The Icon description formula 13 is used to describe the appearance and characteristic of each graph, and it is saved in the icon databank 10 in which an icon code is used as an index. The graphic analyzer 20 then converts these data into controlling points 22 making up the size of the character or graph concerned. The controlling points 22 are then fed into an icon shape variation device 30 which can change the appearance of the icons based on the variable matrix 31. A set of icons controlling points 32 is thus generated based on some graphic requirements (such as changes in appearance, slanting, rotating, inverting, color and toning, etc.). The controlling points 32 are fed into an icons profile generator 40 to generate the icons coordinates matrix 41 which is then input to the profile connecting device 50. This profile connecting device 50 joins the edge coordinate matrix 41 to form a new icon frame 51, and is then classified and saved based on the colors by the color classification buffer 60. The picture frames 61 at different layers are then fed to color palette 70 to generate the color pictures 71 and output to the output buffer 80 for use by other devices. If we need to output the different colored layers directly, then the icons analyzer 20 feeds the icons information 23 to the profile connecting device 50 for connection of the frames, by which profiles of some color are merged together to form a new icon frame 51, and the icon frame with different colors are saved in the color classification buffer 60. If the icon analyzer 20 indicates that coloring is required for a picture, then analyzer 20 will feed the picture information 24 to the color classification buffer 60 for storage under different layers, and then to the color palette 70 for coloring.

Figure 2:
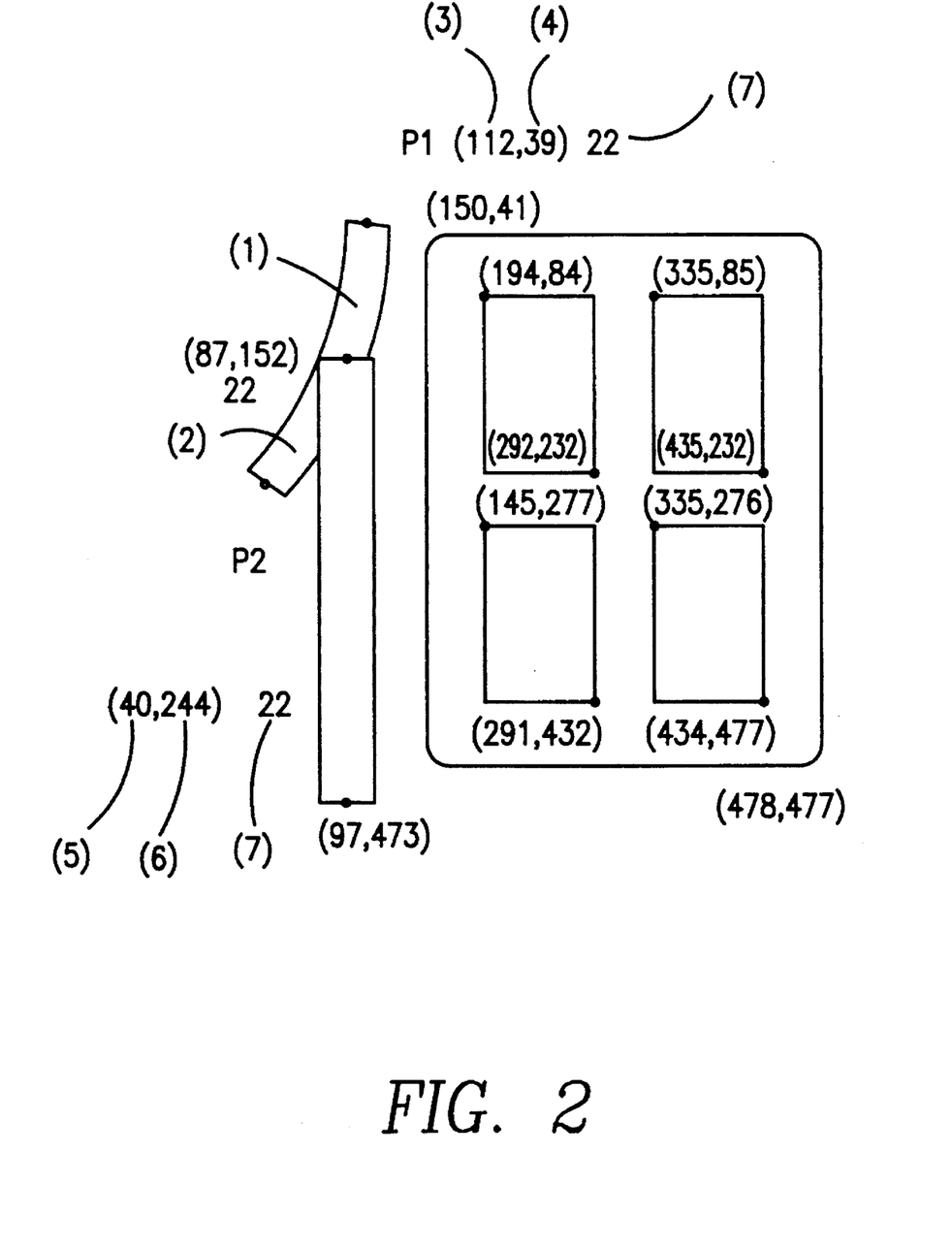
FIG. 2 illustrates a method for creating a typeface for a Chinese character " 信 " with some icons according to the present invention.

Referring to FIG. 2, an illustration using the Chinese character " 信 " to generate a typeface with the icon, wherein <number of icon> is 7 because it is made up of icons " ╱ ", "⏐" and five "☐". <icon 1> is the parameter for " ╱ ", <icon 2> is the parameter for "⏐" and <icon 3> through <icon 7> are the respective parameters for "☐". The format of the individual icon is shown as follows:

ABCDEFGN

Take <icon 1> " ╱ " as an example, the coding for A(1) is 5, B(2) is the color code with "0" for black, C(3), D(4) are the X-Y coordinates (112, 39) of the controlling point P1; E(5), F(6) are the X-Y coordinates (40, 244) of the controlling point P2, G(7) is the vector quantity with a value of 22, N is the ending point with a value of 00. Similarly, <icon 2> is the parameter for "0", the coding for A is 8, B is the color code with "0" for black, C, D are the X-Y coordinates (87, 152) of the controlling point P; E, F are the coordinates (97, 473) of the controlling point P2, G is the vector quantity with a value of 22, N is the ending point with a value of 00; <icon 3> through <icon 7> are the parameters for "□" with a difference in size, in which <icon 3> is larger, <icon 4> thru <icon 7> are identical and all the them are inside the frame of <icon 3>, the above description completes the typeface of a Chinese character "信". When we need to generate the Chinese character "信", we can input the graphic information of "信" into the analyzer 20, which then analyzes the character "信" into a <number of icon> and five <icons> which are saved in an internal register. Each individual icon description formula is called out from the icon databank and transferred to the analyzer 20, these icons are then converted into the above icon descriptive format, i.e., the edge control point for such icons. The edge control points are transferred to the icon shape variation device 30, from there a variable matrix performs a geometrical variation on the icon edge control points, the results of which are fed into an icon profile generator 40. The icon profile generator 40 converts the icons edge control points into the coordinate matrices which are then transmitted into a profile connecting device 50 to connect all the icons edge coordinate matrices and generate an icon such as " ╱ ". When all the coordinates are connected, the icons are fed into a color classification buffer 60 for coloring in different layers, then into a color palette 70 for coloring and sent to the output buffer to combine as a complete word.

Please refer to FIG. 3A, an illustration using a Chinese character " 羊 " to demonstrate how a complete character is formed with a layered display according to the present invention. FIG. 3A illustrates details on coloring of the color classification buffer. When we want to generate a character " 羊 ", we must generate a suffix "+" first. In order to generate "+", we need to generate a black icon "—" 101, a black icon "|" 102, a white icon "—" 103, a black icon "□" 104, and finally a white icon "|? 105, as shown in FIG. 3A. These icons represented the strokes required, some of them are partially overlapped with the color of the topmost layer to cover all the colors beneath. As shown in FIG. 3B, the second layer is a suffix " ₊₊ " of the Chinese character "¥". To generate " ₊₊ ", we need to generate a black icon "—" 201, a black icon "|" 202 at the right side, and another black icon "|" 203 at the left side, a white icon "—" 204 above a black icon "—" 201, and two white icons "|" 206 and 205 on the top, one at the left icon 203 and another at the right icon 202 side. As shown in FIG. 3C, the third layer is "信" and the final combination. In this step, a large, white icon "□" 301 is generated, a small icon "□" 302 is generated above it, and an icon "—" 303 is generated on the top icon 302. A combination from the first layer to the third layer will complete the creation of a Chinese word "¥".

Conventional methods are also unable to handle and process Chinese Cursive or Running scripts in Chinese characters like the present invention does. Instead, the conventional methods must treat each script as a special symbol, thus wasting a lot of memory capacity. The method according to the present invention is able to handle and process the cursive scripts as the regular font. Based on the above examples, the cursive scripts on the words "信" or the word "¥" can be viewed as a combination of a set of icons. Therefore, this invention is a new and remarkable method.

FIG. 4 shows an example of graphic variation produced by this invention. As shown in FIG. 4, there are variations in a figure's eyes, mouth and a stick in its hand. FIGS. 4A, 4B, and 4C indicate the variations in the length of a stick 401, FIGS. 4D, 4E, and 4F display the variations in the size of the left eye 411 and the right eye 421. FIGS. 4G, 4H, 4I, and 4J display the variations in the right eye 421 and the mouth 431. From these drawings we can see that though the variations are minor, the conventional method requires revision of the whole drawing for such variation, but using of the method and device according to the present invention requires changing their parameters only. Therefore, it is indeed a very practical method and device.

Figure 6:
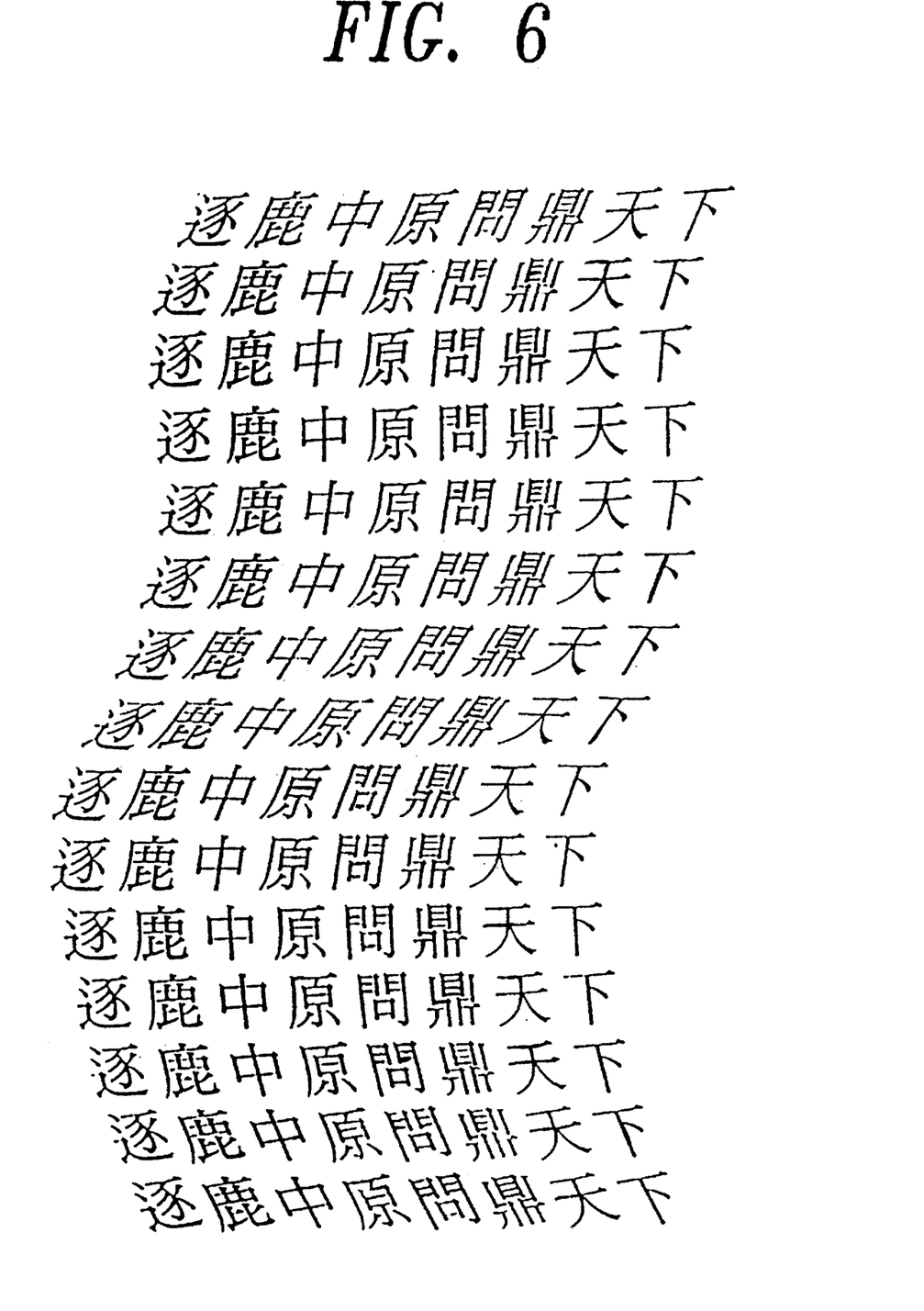
FIG. 6 illustrates an example of waving typefaces according to the present invention.
Figure 7:
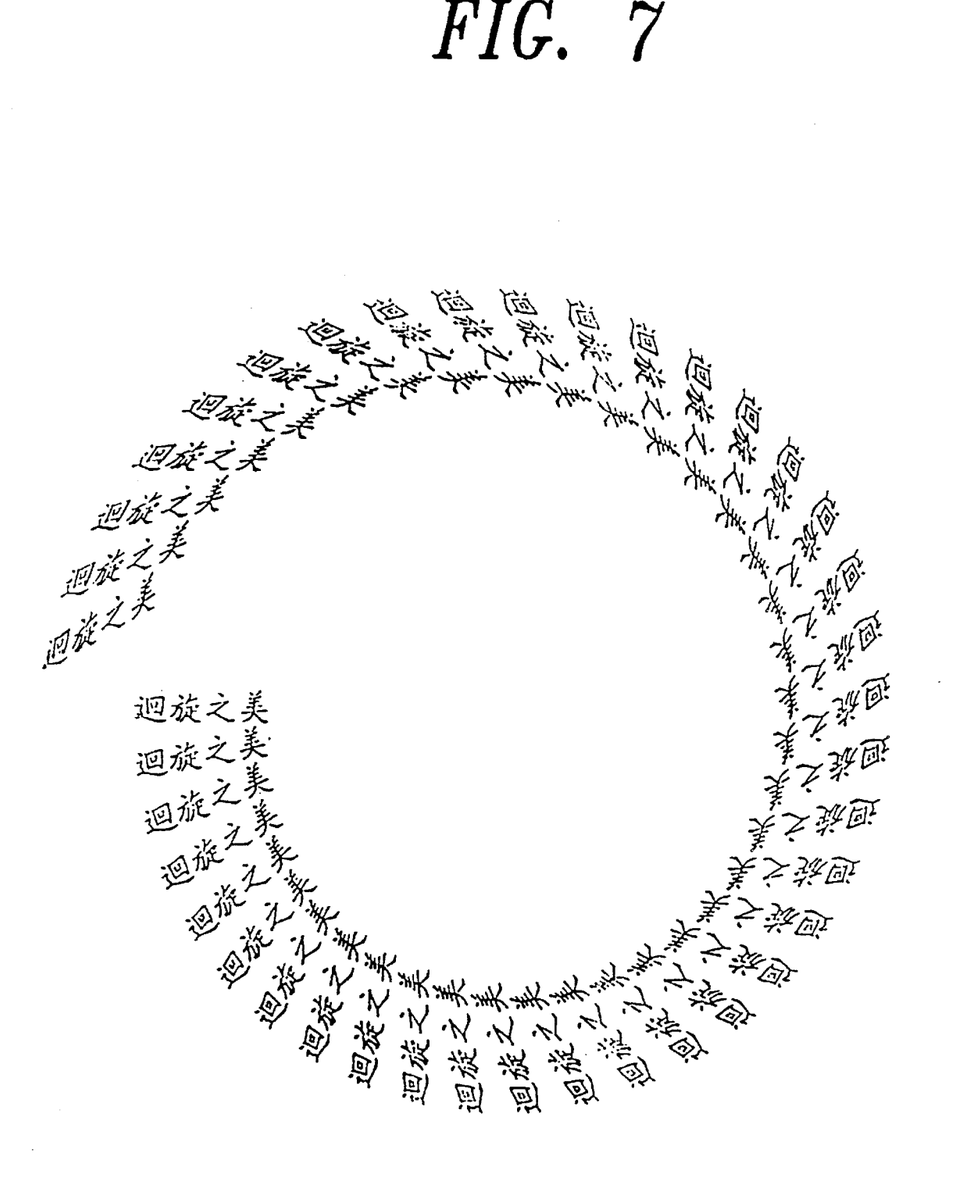
FIG. 7 illustrates an example of typeface rotation according to the present invention.
Figure 8:
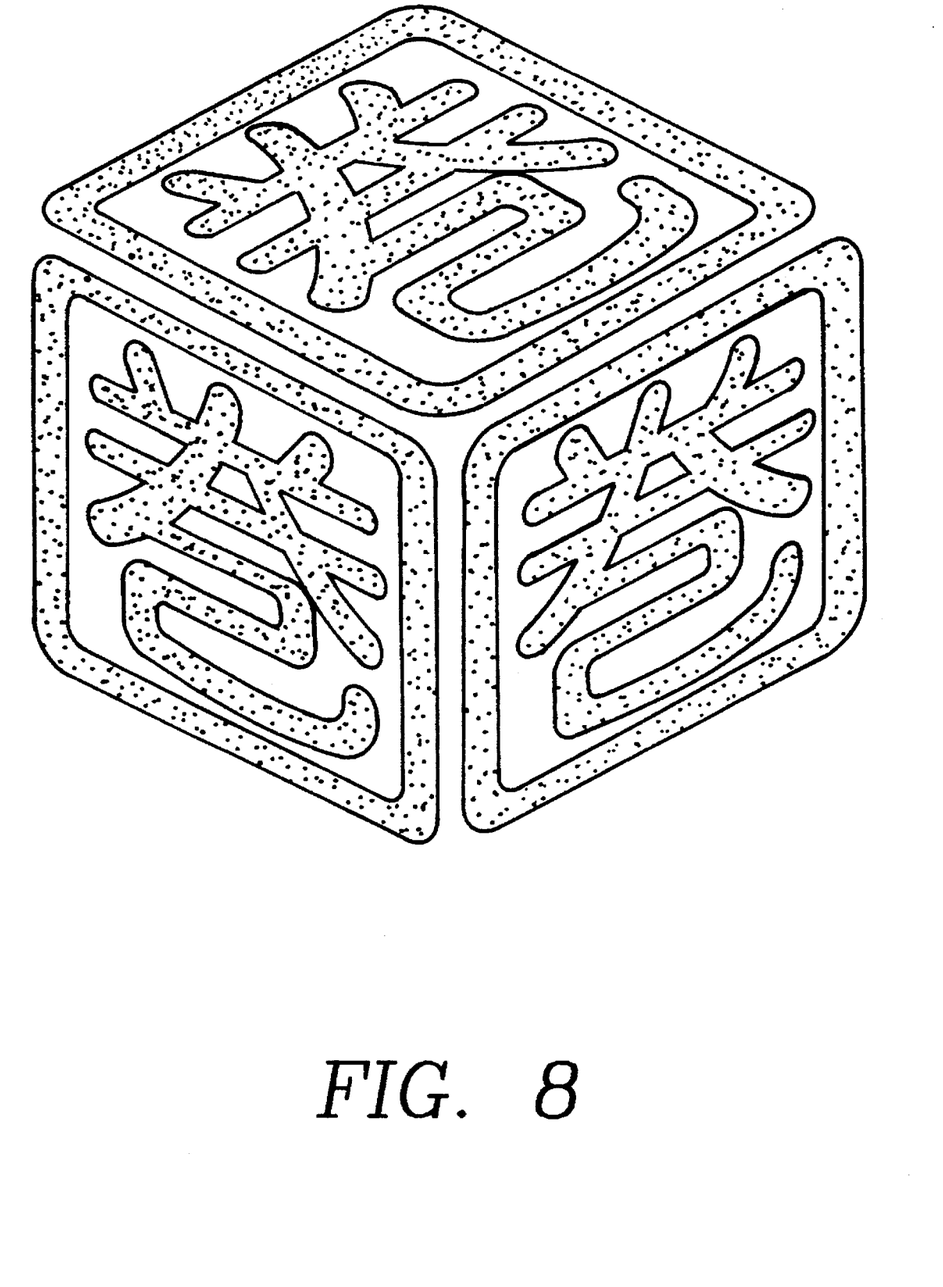
FIG. 8 illustrates an example of typefaces on a dice according to the present invention.

FIGS. 5, 6, 7, 8, and 9 illustrate some examples of typeface variations produced by the present invention. FIG. 5 shows some characters in 3-dimensional outline, 3-dimensional shadow, inverting, etc. FIG. 6 displays a row of words arranged in wave patterns; FIG. 7 is an example of rotation of characters. FIG. 8 shows typeface variations arranged on dice. FIG. 9 is a kind of Chinese cursive scripts generated by this invention.

Based on the above description of a device which generates graphs through different layers, any graph may be viewed as a combination set of icons and several parameters, these icons and parameters are saved in the icon storage, which includes an input graphic analyzer, an icon shape variation device, an icon edge generator, an edge connecting device, a color classification buffer, a color palette and an output buffer; wherein the format of the graph is <number of icons> <icon 1> <icon 2> <icon 3> . . . etc. Each icon is represented by a code and a set of variable parameters. By using the parameters we can precisely control the pattern of the graph. Each icon is further divided into several sub-icons under the same set of icon parameters.

What is claimed is:

1. A method for creating graphs of variable shape and orientation using different layers in a computer in which each graph is made up of one or several icons of different patterns and colors in a format described as <number of icons> <icon> <icon 2> <icon 3> . . . etc, comprising the steps of:

representing each icon by a code and a set of variable parameters in the three groups—color attribute, coordinates and vector quantity—such that <icon> is represented by <code>, <color>, <location coordinates>, <vector quantity>, <icon 2> is represented by <code2>, <color2>, <location coordinates2>, <vector quantity2>, <icon 3> is represented by <code3>, <color3>, <location coordinates3>, <vector quantity3>, and so forth;

controlling the color of each icon by using the color attribute (<color>, <color2> . . . <color3> . . . ) as the basis for coloring said icons;

controlling the location of each icon by locating each of said icons based on said coordinates (<location coordinates>, <location coordinates2>, <location coordinates3> . . . );

controlling the style of each icon, such as the icon's declination and width of stroke by using the vector quantity (<vector quantity>, <vector quantity2>, <vector quantity3 > . . . ) as the basis for generating an icon frame having a selected style; and overlaying each of the one or several icons of different patterns and colors to form said graph of variable shade and orientation.

2. A method for generating graphs with different layers in a computer as claimed in claim 1, further comprising the steps of saving the one or more icons of different patterns and colors and variable parameters of the icons in an icon databank, inputting said one or several icons of different shapes and colors and variable parameters of the icons into a graphic analyzer to analyze the requirements of the graphs, and searching for the appropriate icon variable parameters and color from the icon databank to complete the graph.

3. A method for generating graphs with different layers in a computer as claimed in claim 1, wherein at least one of the icons comprises a plurality of sub-icons under the same set of parameters as said at least one of the icons.

4. A device for creating graphs with different layers in a computer comprising:

an icon databank containing a plurality of icon description formulas;

a graphic analyzer for receiving external graphic information, analyzing icon requirements according to said graphic information, and generating edge controlling points and color codes for each icon based on one or more variable parameters and a preset ratio;

an icon shape variation device for receiving information about the edge controlling points and the color codes from the graphic analyzer, and information from an external variable matrix, and for using the matrix to change the geometry of the edge controlling points and give an output for the change with the original colors;

a profile generator to generate an edge coordinate matrix from the edge controlling points output provided by the icon shape variation;

a profile connecting device for joining the edge coordinates of the matrix from the output of the profile generator, connecting the icons with the same color as well as the icons on the next layer, and providing an output to a color classification buffer;

said color classification buffer serving as a storage device for storing the output from the profile connecting device in different layers based on a difference in colors so that the color classification buffer can send the various colored icon frames to a color palette;

the color palette being for receiving the colored icon frames from the color classification buffer and using the color codes for coloring, in which the coloring is done by building blocks at various layers, the old color being replaced by a new one when a portion of the icon covers another one, and if the icon lacks a color code, then that portion will stay the same way; and an output buffer for storing the completed version of the graph and acting as an output buffer for any other device, whereby each graph is considered to be a combination of a set of icons and several variable parameters that are saved in the icon databank, the variable-shaped matrix is fed into the icon variable-shaped device, a graph is generated by inputting graphic information into the analyzer which then selects corresponding icon formats from the icon databank and converts said icon formats into a set of coordinates for the icon shaping variation device, which convert the icon information through the variable-shaped matrix to generate coordinates that bear the characteristics of the icons, after which the coordinates are sent to the profile generator to create a profile coordinate matrix for the connection of a new icon frame at the profile connecting device, the new icon frame is sent to the color classification buffer on different layers based on the various color types, and each layer is colored in order by the color palette to generate a colored picture at the output buffer.

5. A device for creating graphs with different layers in a computer as claimed in claim 4, wherein said icon databank saves the icon formats, the formats are used to describe the characteristic of each icon by index, each icon is made up of several sub-icons and said icon may share the icon and the variable parameters; and the variable parameters may be changed to generate the same icon in different patterns.

6. A device for creating graphs with different layers in a computer as claimed in claim 5, wherein an input buffer may be added to the graphic analyzer for buffering of the input information.

7. A device for creating graphs with different layers in a computer as claimed in claim 5, wherein a profile connecting device is used to connect profiles of the same color to form a new icon frame, and icon frames with different colors are saved in the color classification buffer.

8. A device for creating graphs with different layers in a computer as claimed in claim 5, wherein the color classification buffer is used to store the icons that require coloring and output to the color palette.

* * * * *